United States Patent
Park et al.

(10) Patent No.: US 11,347,226 B2
(45) Date of Patent: May 31, 2022

(54) METHOD OF REDEFINING POSITION OF ROBOT USING ARTIFICIAL INTELLIGENCE AND ROBOT OF IMPLEMENTING THEREOF

(71) Applicant: LG ELECTRONICS INC., Seoul (KR)

(72) Inventors: Joongtae Park, Seoul (KR); Jungsik Kim, Seoul (KR); Hyoungrock Kim, Seoul (KR); Seungmin Baek, Seoul (KR)

(73) Assignee: LG ELECTRONICS INC., Seoul (KR)

(*) Notice: Subject to any disclaimer, the term of this patent is extended or adjusted under 35 U.S.C. 154(b) by 323 days.

(21) Appl. No.: 16/489,316

(22) PCT Filed: Apr. 25, 2019

(86) PCT No.: PCT/KR2019/005013
§ 371 (c)(1),
(2) Date: Aug. 27, 2019

(87) PCT Pub. No.: WO2020/218644
PCT Pub. Date: Oct. 29, 2020

(65) Prior Publication Data
US 2021/0325889 A1    Oct. 21, 2021

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 1/0238* (2013.01); *G05D 1/0246* (2013.01); *G05D 1/0274* (2013.01)

(58) Field of Classification Search
CPC .. G05D 1/0214; G05D 1/0088; G05D 1/0238; G05D 1/0246; G05D 1/0274
See application file for complete search history.

(56) References Cited

U.S. PATENT DOCUMENTS 8,364,309 B1 * 1/2013 Bailey ............... G05D 1/0272
                                                    700/245
10,695,906 B2 * 6/2020 Kim ....................... B25J 9/1666
(Continued)

FOREIGN PATENT DOCUMENTS

JP      2006346767      12/2006
KR    1020100098999      9/2010
(Continued)

OTHER PUBLICATIONS

PCT International Application No. PCT/KR2019/005013, International Search Report dated Jan. 23, 2020, 3 pages.

*Primary Examiner* — Ramsey Refai
(74) *Attorney, Agent, or Firm* — Lee Hong Degerman Kang & Waimey

(57) ABSTRACT

A method and a robot of redefining a position of a robot using artificial intelligence are disclosed, and the robot that redefines a position using artificial intelligence separately stores an entrance-allowable area and an entrance-unallowable area in a space in which the robot moves as a map and stores locating posts that are required for the robot to restore a position thereof.

16 Claims, 15 Drawing Sheets

(56) References Cited

U.S. PATENT DOCUMENTS

| | | | |
|---|---|---|---|
| 2001/0055063 A1* | 12/2001 | Nagai | G01S 5/16 |
| | | | 348/116 |
| 2006/0293810 A1 | 12/2006 | Nakamoto | |
| 2010/0324773 A1 | 12/2010 | Choi et al. | |
| 2015/0088310 A1* | 3/2015 | Pinter | B25J 9/1676 |
| | | | 700/253 |
| 2019/0133397 A1 | 5/2019 | Choe | |
| 2019/0196497 A1* | 6/2019 | Eoh | G05D 1/0088 |
| 2019/0204844 A1* | 7/2019 | Lau | G05B 15/02 |

FOREIGN PATENT DOCUMENTS

| | | |
|---|---|---|
| KR | 1020120033414 | 4/2012 |
| KR | 1020180132934 | 12/2018 |

* cited by examiner

FIG. 3
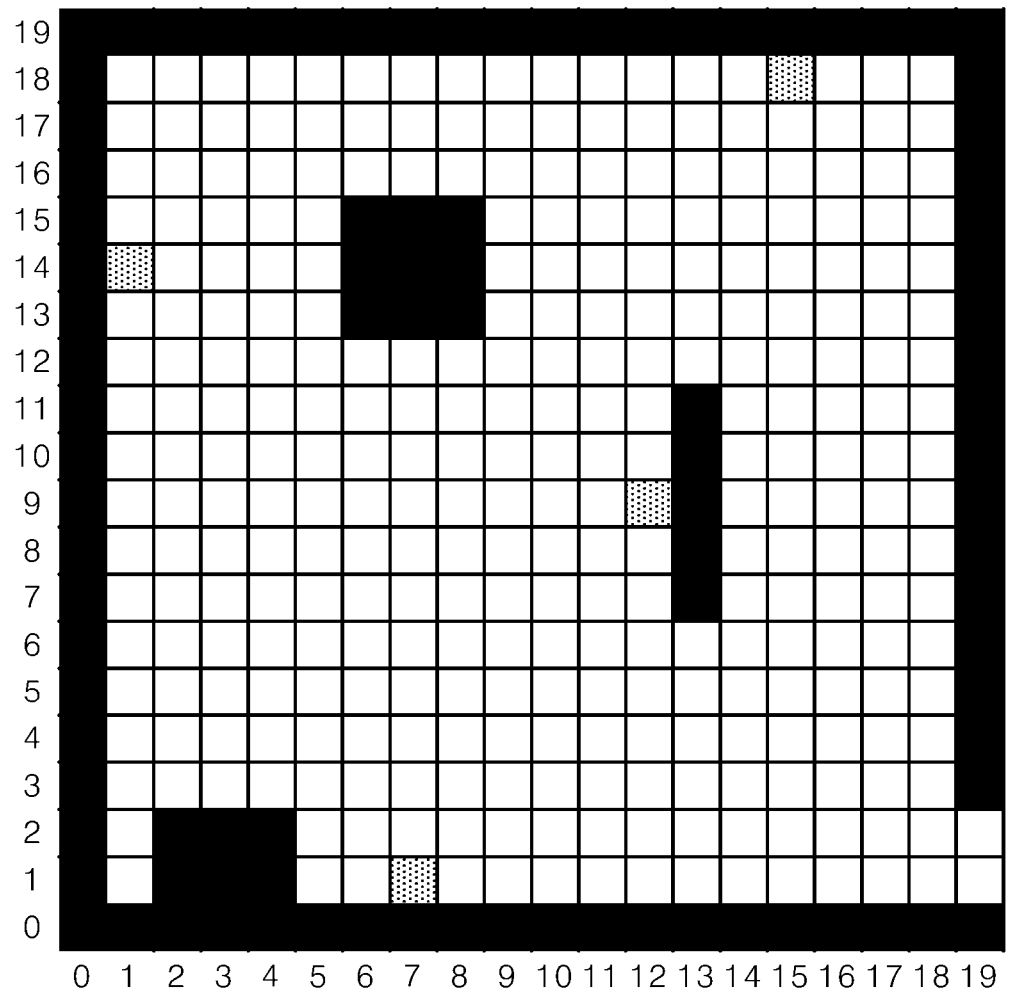
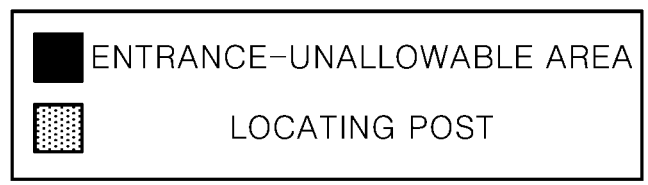

FIG. 4
| LocationName | (x, y, deg) | Image |
|---|---|---|
| Bestshop | (1, 14, 90) | 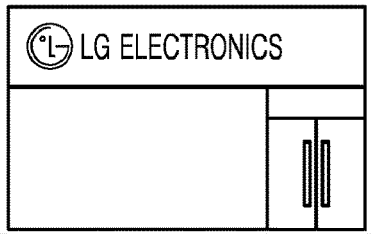 |
| Starbucks | (7, 1, 90) | 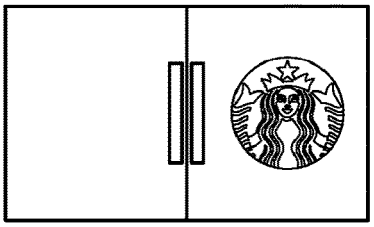 |
| InformationDesk | (12, 9, 180) | 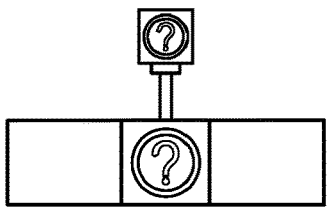 |
| CheckInPanel | (15, 18, 90) | 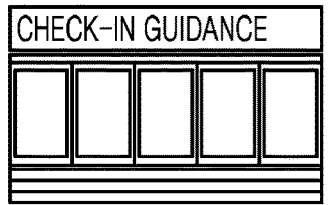 |

FIG. 7
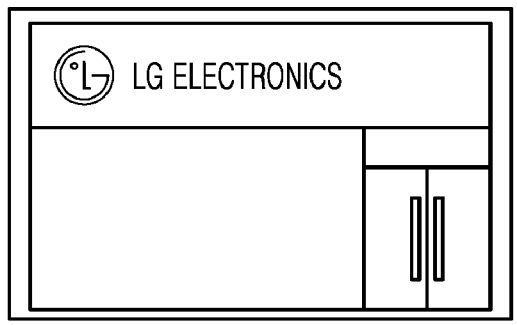
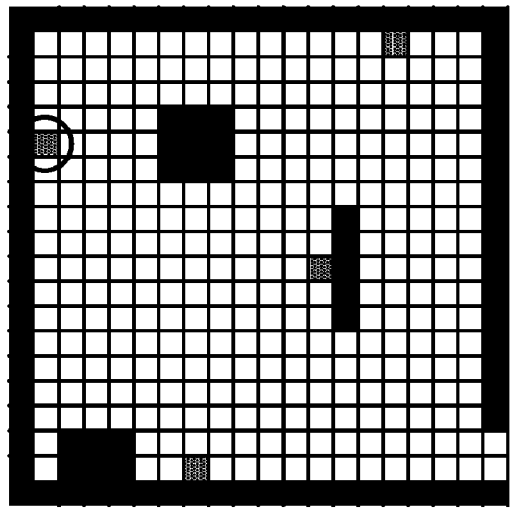

FIG. 10
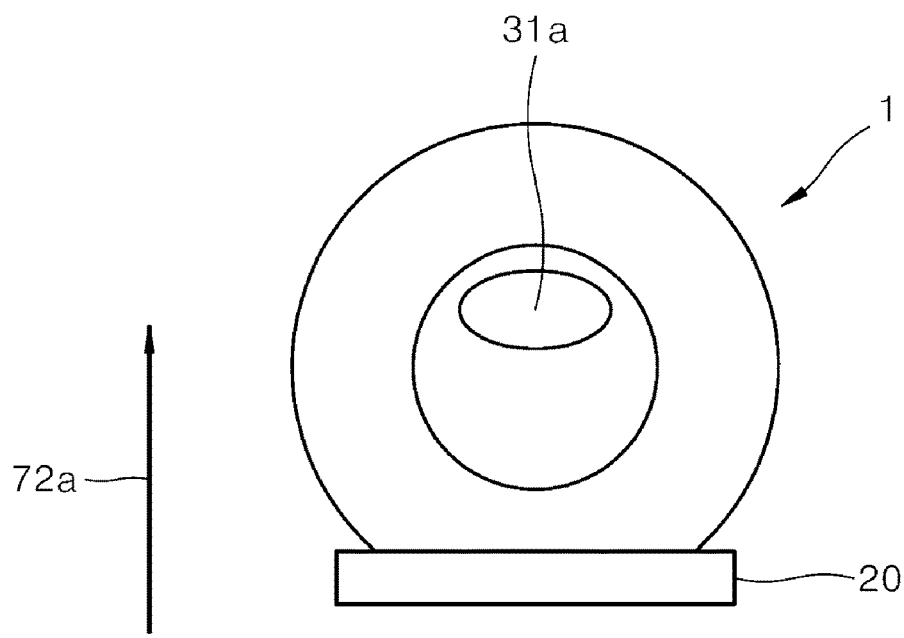
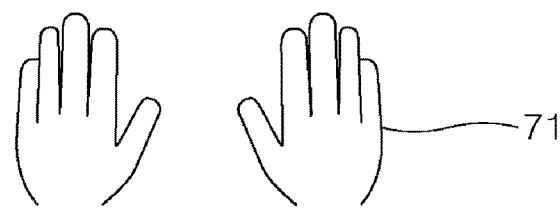
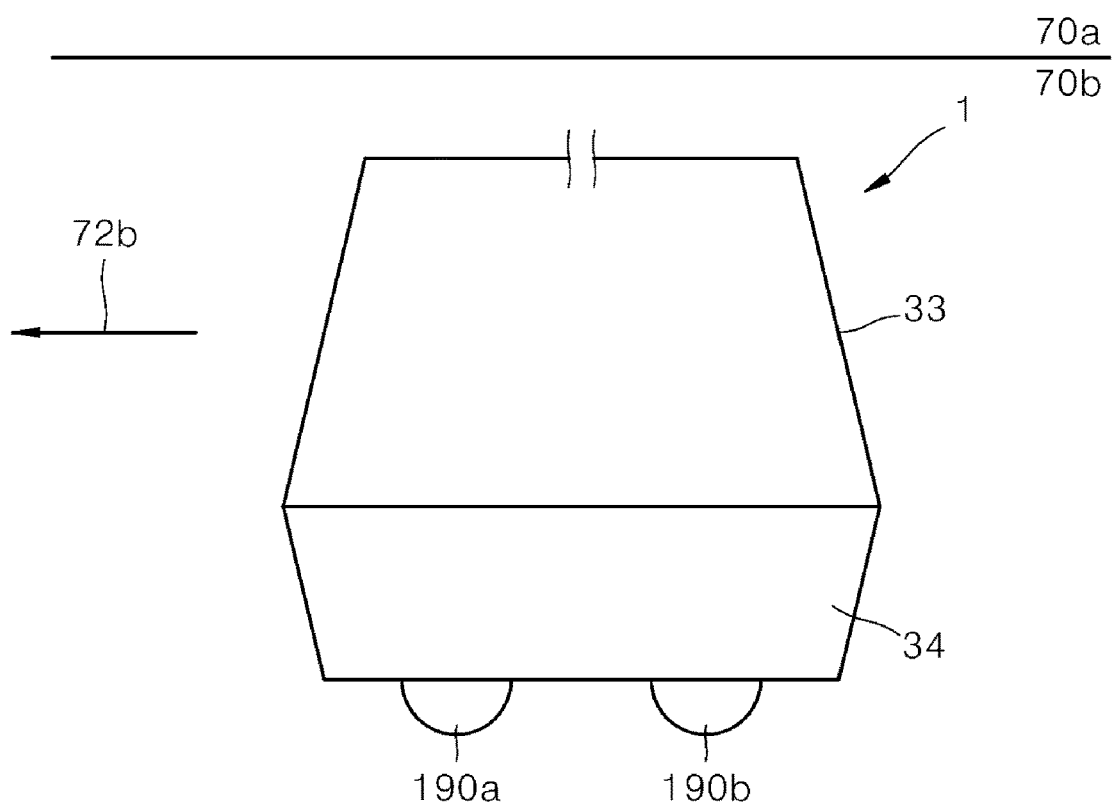

FIG. 12
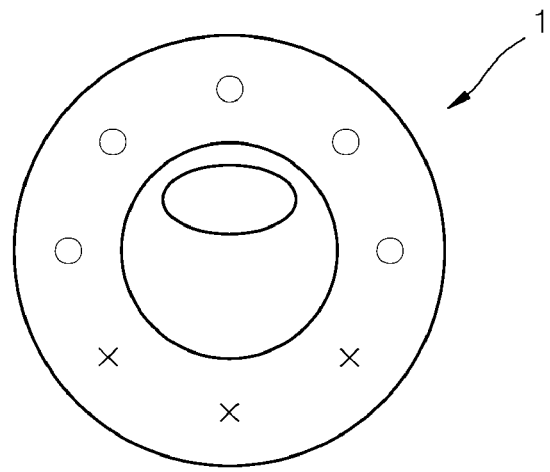
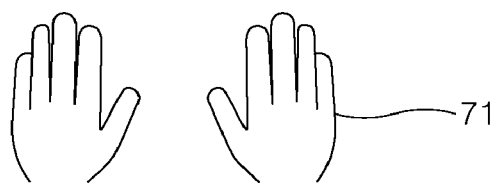
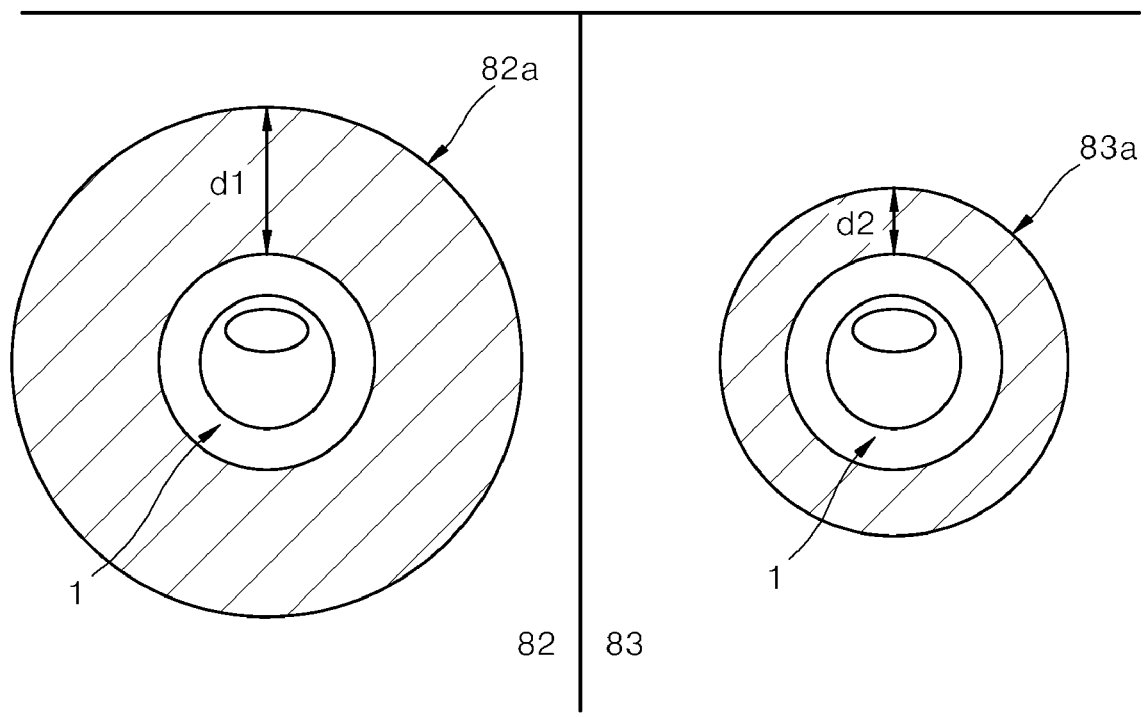

METHOD OF REDEFINING POSITION OF ROBOT USING ARTIFICIAL INTELLIGENCE AND ROBOT OF IMPLEMENTING THEREOF

CROSS-REFERENCE TO RELATED APPLICATIONS

This application is the National Stage filing under 35 U.S.C. 371 of International Application No. PCT/KR2019/005013, filed on Apr. 25, 2019, the contents of which are hereby incorporated by reference herein in its entirety.

TECHNICAL FIELD

The invention relates to a method of redefining a position of a robot using artificial intelligence and a robot that implements the method.

BACKGROUND ART

In spaces in which human resources and material resources are actively exchanged such as large-scale marts, department stores, airports, and golf courses, robots may be provided to provide information or convenience to people.

Guide robots, security robots, cleaning robots, and the like can be used as such robots. These robots ascertain their positions and move in spaces.

On the other hand, in order for a robot to ascertain its position, to avoid an obstacle, and to move in a space, the robot has to store information on the space and information on a current position of the robot, routes on which the robot moved previous, or the like.

However, when robots do not ascertain their positions or do not temporarily update information on routes while moving in a complicated space, positions of the robots have to be redefined. However, when there are a plurality of robots, robots have to be remotely controlled, or individual robots cannot be independently controlled due to a too wide space, a lot of labor is required for accurately controlling the robots.

DISCLOSURE

Technical Problem

The present disclosure is invented to solve the above-mentioned problems and is for providing an interface that can restore a position when a robot cannot ascertain the position in a space.

The present disclosure is for providing information such that a user can smoothly restore a position of a robot by providing image information on the position to easily perform a position restoring process of the robot using an interface.

The present disclosure is for enabling a robot to operate in a particular mode such that the robot can move easily to a position restoration location under the control of a user.

The invention is not limited to the above-mentioned objectives and other objectives and advantages of the invention which are not mentioned above can be understood from the following description and can be more apparently understood from embodiments of the invention. It can be easily understood that objectives and advantages of the invention will be able to be embodied by means described in the appended claims and combinations thereof.

Technical Solution

A robot that redefines a position using artificial intelligence according to an embodiment of the invention separately stores an entrance-allowable area and an entrance-unallowable area in a space in which the robot moves as a map, and stores locating posts that are required for the robot to restore a position thereof.

When the robot is not able to ascertain the position of the robot from a map storage unit, the robot that redefines a position using artificial intelligence according to an embodiment of the invention causes, an interface unit to output one or more locating posts and then causes the interface unit to receive information for selecting one of the output locating posts.

The robot that redefines a position using artificial intelligence according to the embodiment of the invention may control a movement unit such that the robot moves in response to an external force which is applied to the robot.

The robot that redefines a position using artificial intelligence according to the embodiment of the invention may perform a process of restoring the position of the robot when the robot has arrived at the selected locating post.

In the robot that redefines a position using artificial intelligence according to the embodiment of the invention, when the control unit is not able to ascertain the position of the robot from the map storage unit, the control unit may compare the image captured by the camera unit with images of the locating posts stored in the map storage unit, select one locating post, and causes the robot to move to the selected locating post.

A method of redefining a position of a robot using artificial intelligence according to an embodiment of the invention includes: causing a control unit of the robot to determine that the position of the robot is not able to be ascertained from a map storage unit of the robot; causing an interface unit of the robot to output one or more locating posts stored in the map storage unit; and causing the interface unit to receive information for selecting one of the output locating posts.

The method of redefining a position of a robot using artificial intelligence according to the embodiment of the invention may further include: causing the control unit to store a route for moving to the selected locating post with a position at which the one or more locating posts have been output or a position at which the one locating post has been selected as a starting point; and causing the control unit to ascertain the starting point on the map on the basis of the position of the selected locating post on the map and the route when the robot arrives at the selected locating post.

Advantageous Effects

According to the embodiments of the invention, it is possible to provide an interface that can restore a position when a robot cannot ascertain the position in a space such that the robot can restore a position without performing any complicated process.

According to the embodiments of the invention, it is possible to provide information such that a user can smoothly restore a position of a robot by providing image information on the position to easily perform a position restoring process of the robot using an interface.

According to the embodiments of the invention, it is possible to enable a movement unit and a sensor of a robot to operate in a particular mode such that the robot can move easily to a position restoration location under the control of a user.

Advantageous effects of the invention are not limited to the above description and those skilled in the art can easily derive various advantageous effects of the invention from the configurations of the invention.

DESCRIPTION OF DRAWINGS

FIG. 3 is a diagram illustrating a configuration of a map according to an embodiment of the invention.

FIG. 4 is a diagram illustrating locating posts and images according to an embodiment of the invention.

FIGS. 6 to 8 are diagrams illustrating a routine of causing a robot to move manually to a locating post according to an embodiment of the invention.

FIG. 10 is a diagram illustrating a routine of controlling a movement unit and an obstacle sensor when a robot is moving manually according to an embodiment of the invention.

FIG. 12 is a diagram illustrating a routine of causing a robot to avoid an obstacle when the robot moves manually according to an embodiment of the invention.

DETAILED DESCRIPTION

Figure 1:
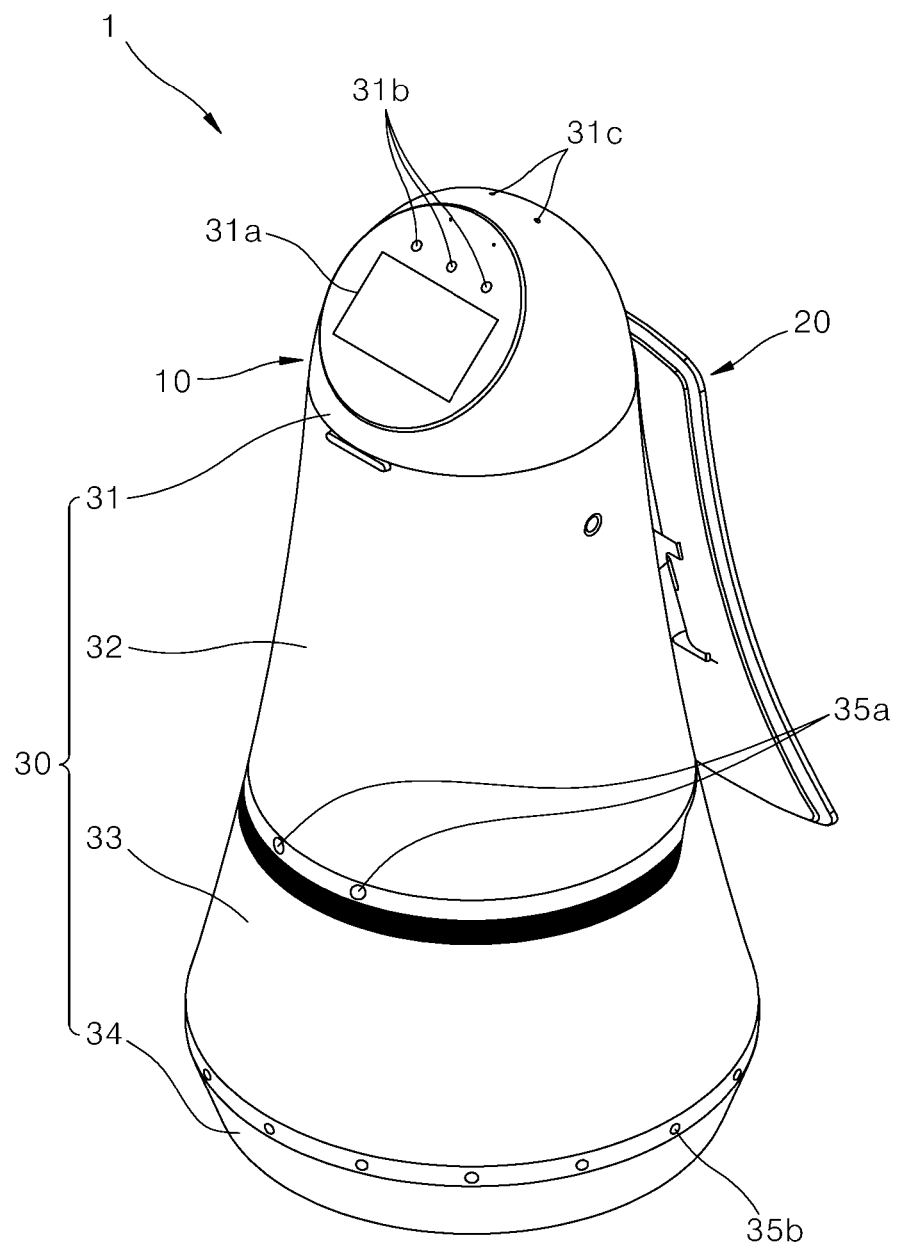
FIG. 1 is a diagram illustrating appearance of a robot according to an embodiment of the invention.

Hereinafter, embodiments of the invention will be described in detail with reference to the accompanying drawings such that the invention can be easily implemented by those skilled in the art. The invention can be embodied in various forms and is not limited to the embodiments.

Parts which are not associated with description will be omitted in order to clearly describe the invention, and the same or similar elements over the entire specification will be referred to by the same reference signs. Some embodiments of the invention will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

This work was supported by the ICT R&D program of MSIT/IITP[2017-0-00306, Development of Multimodal Sensor-based Intelligent Systems for Outdoor Surveillance Robots].

In embodying the invention, elements can be segmented and described for the purpose of convenience of explanation, these elements may be embodied in one device or module, or one element or may be divided and embodied into two or more devices or modules.

In the present disclosure, a robot includes a device that has a special objective (such as cleaning, security, monitoring, or guidance) or moves while providing a function based on characteristics of a space in which the robot moves. Accordingly, a robot in the present disclosure common refers to devices that have moving means capable of moving using predetermined information and sensors and providing a predetermined function.

A robot in the present disclosure can store a map and move. A map refers to information on fixed objects such as fixed walls and stairs which do not move in a space. Information on moving objects, that is, dynamic objects, which are periodically arranged, can also be stored in a map.

For example, information on obstacles which are arranged within a predetermined range with respect to a traveling direction of a robot can also be stored in a map. In this case, unlike the map in which the fixed objects are stored, information on obstacles can be temporarily registered in a map and can be removed from the map after a robot has moved.

A robot in the present disclosure can ascertain external dynamic objects using various sensors. When external dynamic objects are ascertained, occupation states of obstacles at a waypoint through which the robot moves to a destination in an environment in which there are many pedestrians.

The robot can determine that the robot arrives flexibly at a waypoint depending on a degree of change in orientation at the waypoint, travels to a next waypoint, and successfully travel to a destination.

FIG. 1 is a diagram illustrating appearance of a robot according to an embodiment of the invention. FIG. 1 illustrates an exemplary appearance and a robot according to the invention can be embodied in various appearances other than the appearance illustrated in FIG. 1. Particularly, elements can be arranged at different positions on up, down, right, left, front, and rear sides depending on the shape of the robot.

A main body 10 is formed to be long in a vertical direction and has a roly-poly shape which is narrowed from the bottom to the top as a whole.

The main body 10 includes a case 30 that forms the appearance of a robot 1. The case 30 includes a top cover 31 that is disposed on the top side, a first middle cover 32 that is disposed under the top cover 31, a second middle cover 33 that is disposed under the first middle cover 32, and a bottom cover 34 that is disposed under the second middle cover 33. The first middle cover 32 and the second middle cover 33 may be formed as a single middle cover.

The top cover 31 is located at the uppermost end of the robot 1 and has a semispherical or dome shape. The top cover 31 is located at a height lower than the height of an adult to easily receive a command from a user. The top cover 31 is configured to rotate by a predetermined angle.

On the other hand, the robot 1 further includes a control module 150 therein. The control module 150 controls the robot 1 like a kind of computer or processor. Accordingly, the control module 150 is disposed in the robot 1, performs a function similar to that of a main processor, and performs an interaction with a user.

The top cover 31 is provided with a display unit 31a that receives a command from a command or outputs information, a camera 31b, and a sensor such as a microphone 31c on one side of the front surface thereof.

In addition to the display unit 31a of the top cover 31, a display unit 20 is provided on one side of the first middle cover 32.

Depending on the functions of the robot, both of the two display units 31a and 20 may output information or only one thereof may output information.

On the other hand, various obstacle sensors 220 (in FIG. 2) such as obstacle sensors 35a and 35b are disposed on one side surface or the entire lower end part of the robot 1. Examples of the obstacle sensors include a time of flight (TOF) sensor, an ultrasonic sensor, an infrared sensor, a depth sensor, a laser sensor, and a LIDAR sensor. These sensors sense an external obstacle outside the robot 1 in various manners.

The robot illustrated in FIG. 1 further includes a movement unit which is an element that allows the robot to move at the bottom of the robot. The movement unit is an element that allows the robot to move such as a kind of wheels.

The shape of the robot illustrated in FIG. 1 is only an example and the invention is not limited thereto. Various cameras and sensors of the robot can be disposed at various positions of the robot 1. An example of the robot illustrated in FIG. 1 is a guide robot that provides information to a user, moves to a specific position, and guides a user.

Other examples of the robot 1 illustrated in FIG. 1 include robots that provide cleaning, security, or other functions. The robot can provide various functions, but a guide robot is mainly described in this specification for the purpose of convenience of explanation.

A plurality of robots of which each is the same as illustrated in FIG. 1 are disposed in a service space and the robots perform specific functions (such as guidance, cleaning, and security). Each robot 1 normally stores its position. The robot 1 ascertains a current position thereof in the overall space, and generates a route which is required to move to a destination.

Figure 2:
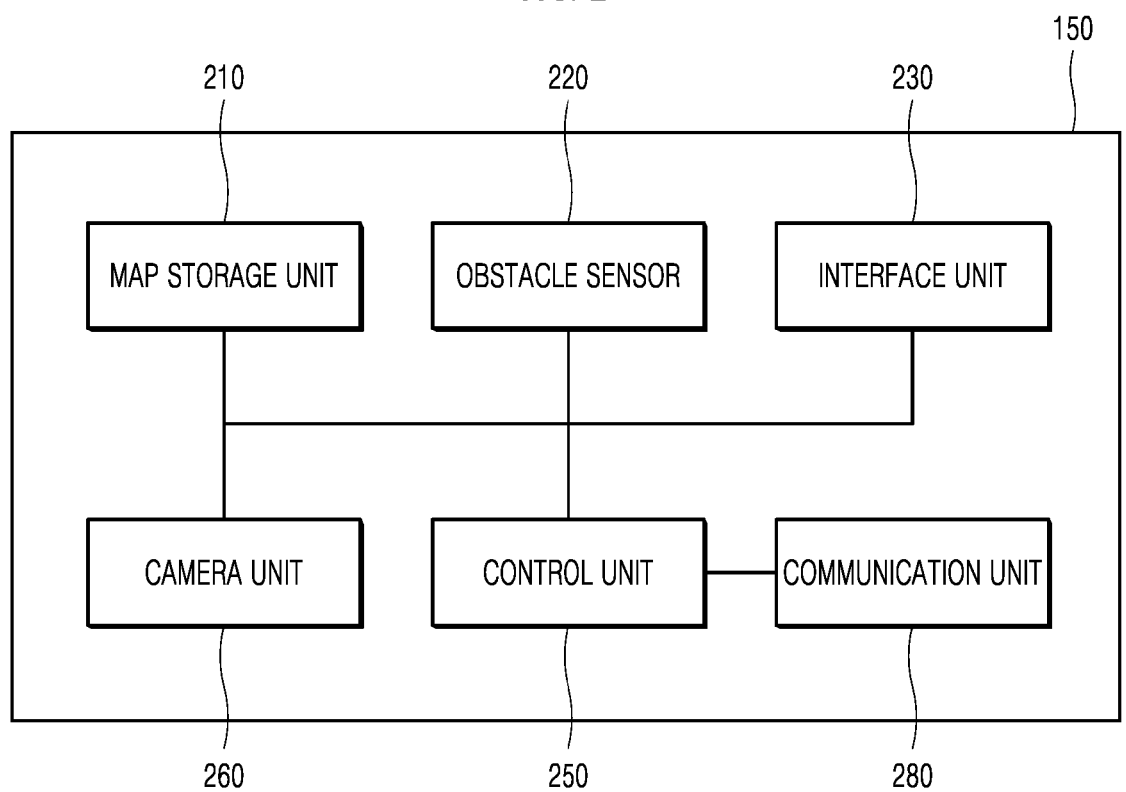
FIG. 2 is a diagram illustrating elements of a control module of a robot according to an embodiment of the invention.

FIG. 2 is a diagram illustrating elements of a control module of a robot according to an embodiment of the invention.

The control module 150 of the robot 1 includes the following elements. An interface unit 230 outputs information and receives information from the outside. An example thereof is a touch screen. An obstacle sensor 220 senses an obstacle outside. The obstacle sensor 220 is disposed at various positions of the robot as illustrated in FIG. 1.

A map storage unit 210 separately stores an entrance-allowable area and an entrance-unallowable area in a space I the robot moves in a map. The map storage unit 210 stores locating posts which are required for the robot to restore the position thereof. The map is illustrated in FIG. 3 and the locating posts are illustrated in FIG. 4.

A camera unit 260 captures an image near the robot.

A control unit 250 controls the obstacle sensor 220 and a movement unit such that the position of the robot is identified on the map. However, in the course of movement, the control unit 250 performs a process of restoring a position when the position of the robot cannot be ascertained from the map storage unit 210.

For example, the control unit 250 outputs one or more locating posts by controlling the interface unit 230. A user selects one of the locating posts output to the interface unit 230 and the interface unit 230 receives selected information.

Here, when the robot moves to the selected locating post by a user, the control unit 250 can perform a position restoring process.

For example, when the position of the robot cannot be ascertained from the map storage unit 210, the control unit 250 compares an image captured by the camera unit 260 with images of the locating posts stored in the map storage unit 210 and selects one locating post.

Here, the control unit 250 can select an image with higher similarity by comparing two images. Alternatively, the control unit 250 can arrange the locating posts from the locating post closest to the latest position and compare an image of the closest locating post with a surrounding image.

Then, the control unit 250 causes the robot 1 to move to the selected locating post. In the course of movement, the control unit 250 captures an image of the surroundings using the camera unit 260 and causes the robot to move the locating post.

The robot can ascertain the current position of the robot using information on a moving route of the robot measured while moving and map information of the map storage unit 210. When the robot fails to ascertain the position, the robot can move to a specific position and redefine the position of the robot. The specific position is referred to as a locating post.

The map storage unit 210 stores coordinate information on locating posts in the space and image information of the locating posts as position restoration information. The coordinate information includes x and y coordinate information of the robot in the map and angle information with which an image can be ascertained or the robot should orient itself at the locating posts such as (x, y, deg). There are a plurality of pieces of position restoration information which form one set.

The number of locating posts or the positions of the locating posts are flexibly determined depending on the size of the space in which the robot moves. The locating posts can be determined at positions which can be identified using an image or at positions which are conspicuous or can be easily ascertained by the robot through comparison of images.

When the robot fails to ascertain the position, an operator causes the robot to move to a position currently closest to the robot in a plurality of sets of position restoration information. Then, the operator can locate the robot as in the image displayed in the position restoration information and then to perform a position restoring function.

The coordinate information (x, y, deg) included in the sets of position restoration information is input as current position information of the robot to the robot.

In this case, when an autonomously traveling robot fails to ascertain its position, even a nonprofessional can reliably restore the position of the robot.

The autonomously traveling robot may identify the locating post by comparing images stored therein with a currently captured image.

FIG. 3 is a diagram illustrating a configuration of a map according to an embodiment of the invention.

The map storage unit 210 two-dimensionally stores a space in which the robot moves. The map 210a illustrated in FIG. 3 separately displays an area (white) which the robot can enter, an area (black) which the robot cannot enter, and locating posts in a 20×20 bitmap space. When the map is stored, values can be input instead of colors or patterns. When a map is configured as illustrated in FIG. 3, the robot ascertains a position by comparing the map with the position of the robot. The robot can also ascertain an area which the robot cannot enter.

For example, a value of 0 is stored to indicate a white color of an entrance-allowable area in a 20×20 matrix. Alternatively, a value of 99 is stored to indicate a black color of an entrance-unallowable area. An angle and image information are stored for each locating post.

The entrance-unallowable areas which the robot cannot enter and the locating posts are displayed in FIG. 3. Each locating post is located at a specific position in the map and also includes angle information (deg) at which the robot should be arranged to restore the position. Each locating post can be stored along with particular photograph information. This image information is required for a user to move the robot at the photograph. Alternatively, the robot is allowed to move by searching for an image of the surroundings and comparing the searched image of the surroundings with the photograph.

FIG. 4 is a diagram illustrating locating posts and images according to an embodiment of the invention. For example, each locating post which is stored in the map storage unit 210 includes a location name, position coordinates (x, y, deg), and an image at the position.

The angle in the coordinates is angle information at which the robot should be arranged at the corresponding position. For example, the angle may be an angle by which the robot should rotate about the left wall at the position. The angle information may be omitted.

One or more pieces of image information can be stored. For example, the map storage unit 210 may store image information which is obtained by capturing an image at different angles such that the robot can automatically identify a locating post.

Figure 5:
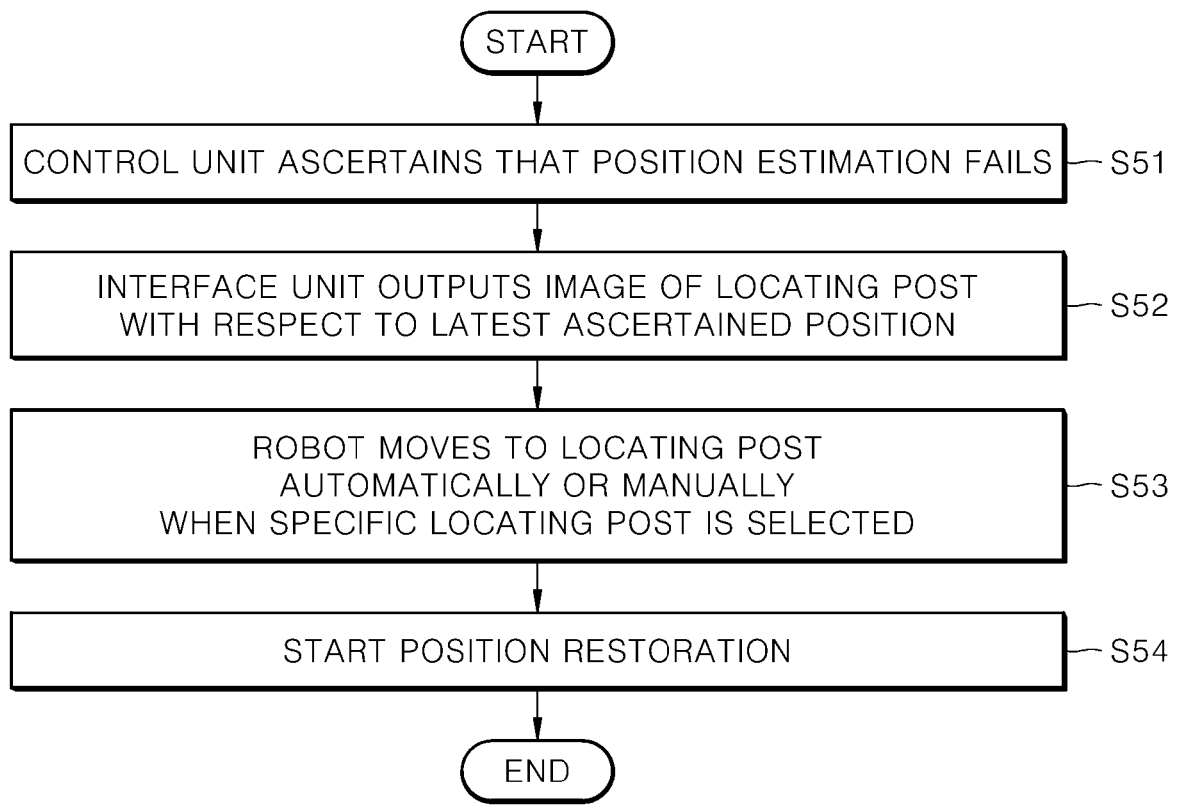
FIG. 5 is a flowchart illustrating a routine of causing a robot to move to a locating post according to an embodiment of the invention.

FIG. 5 is a flowchart illustrating a routine of causing a robot to move to a locating post according to an embodiment of the invention.

The control unit 250 of the robot ascertains that estimation of a position has failed (S51). For example, when the robot moves without accumulating route information due to an external force or a space has a structure different from a map stored in the robot, the robot may fail to estimate a position.

The interface unit 230 outputs an image of a locating post with respect to a position which has been ascertained latest (S2). For example, the image may be output from the display units referred to by 31a and 20 in FIG. 1.

A user compares the output image with a surrounding image and ascertains whether there is the same location as the image of the locating post in near locations. Then, the user touches the locating post in the interface unit 230.

Thereafter, the robot moves to the locating post automatically or manually (S53). Automatic movement means that the robot 1 moves to the locating post without external control. The robot 1 captures an image of the surroundings using the camera unit 260. Then, the control unit 250 compares the image of the selected locating post with the captured image and causes the robot to move to the locating post.

Manual movement means that the user controls the robot 1 such that the robot 1 moves to the locating post.

When the robot 1 arrives at the locating post, the user selects position restoration in the interface unit 230, and the control unit 250 performs position restoration (S54). Alternatively, the robot 1 automatically ascertains whether the robot has arrived at the locating post and performs position restoration.

In the routine illustrated in FIG. 5, when the autonomously traveling robot fails to estimate a position, a user who is a nonprofessional can cause the robot to move to the locating post and restore the position. That is, since the robot can reliably rapidly restore the position, it is possible to minimize an operation stop time of the robot.

Figure 6:
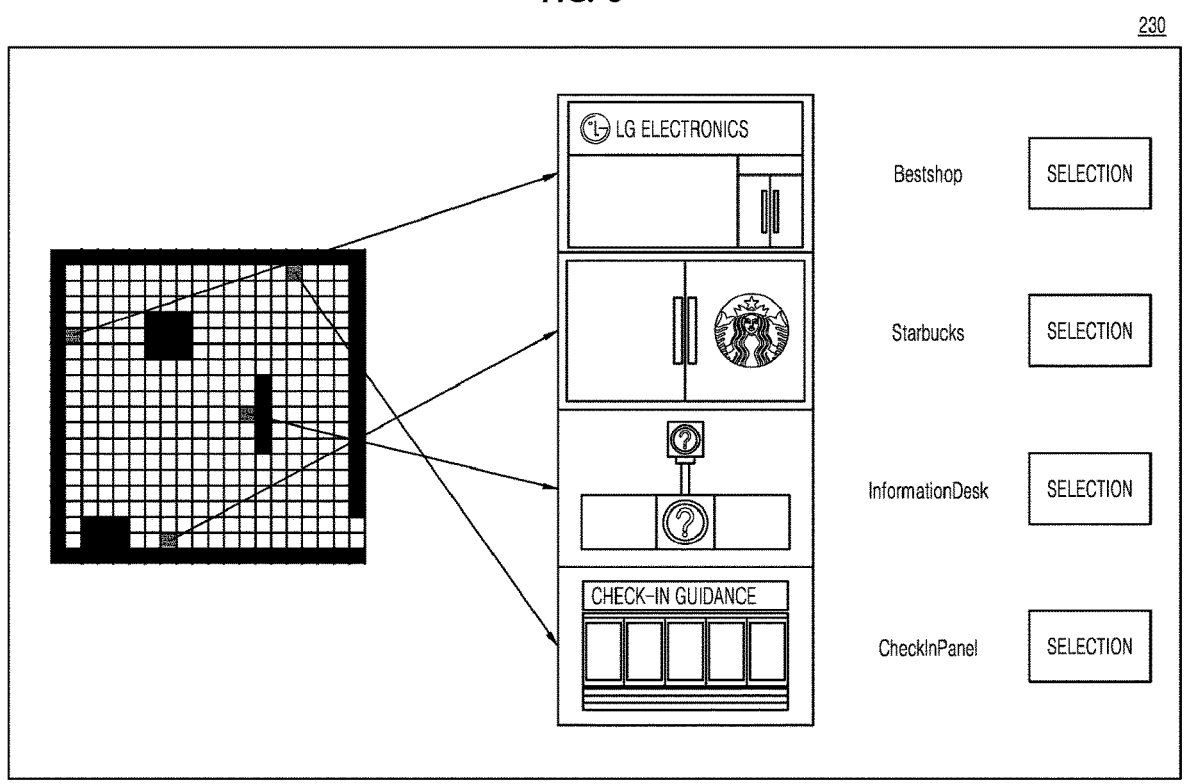
Figure 8:
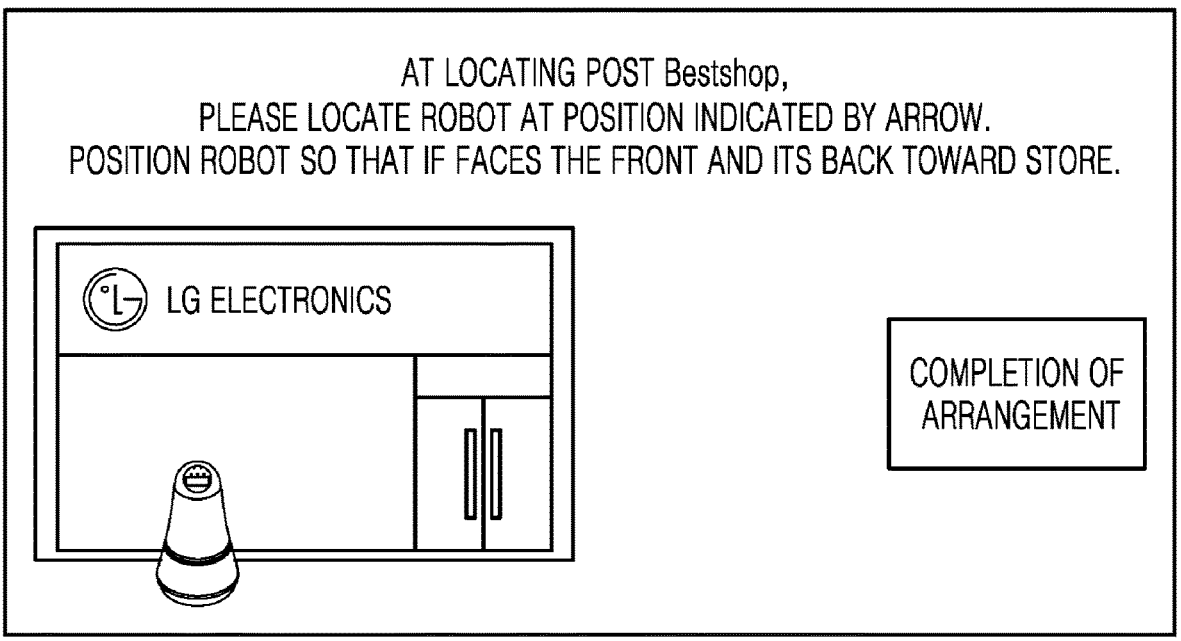

FIGS. 6 to 8 are diagrams illustrating a routine of causing a robot to move manually to a locating post according to an embodiment of the invention. It is assumed that the robot have failed to estimate its position.

Accordingly, the robot cannot ascertain its position form the map illustrated in FIG. 4.

As illustrated in FIG. 7, the robot outputs images of four locating posts from the interface unit 230 as described above with reference to FIG. 5.

The interface unit 230 outputs images of a plurality of locating posts. When the robot stores rough information on a space in which the robot is located, the interface unit 230 can output only images of locating posts included in the space.

For example, when the robot ascertains that its position is in a range of from (0, 0) to (8, 16) in the map illustrated in FIG. 3, the interface unit 230 can output two locating posts Bestshop and Starbucks.

The interface unit 230 can output images and names of the locating posts. The interface unit 230 also outputs a selection button for selecting a locating post.

A user selects an image which is ascertained in the vicinity of the robot out of four images displayed on the interface unit 230. For example, the user may select the uppermost image Bestshop. Then, the user causes the robot 1 to move to the selected locating post.

FIG. 7 illustrates information which is output from the interface unit in a state in which a user has caused the robot to move to the first locating post After moving to the first locating post, the interface unit 230 of the robot 1 locates the robot at the locating post and then arranges the front side of the robot as described in the image.

Then, when the user selects an arrangement completion button, the control unit of the robot 1 restores the position of the robot using the position of the locating post ((1, 14) in FIG. 4). A state in which the position of the robot has been restored to the position of a circle may be additionally displayed on a map 210a illustrated in the lower part of FIG. 7 on the interface unit 230.

FIG. 8 illustrates information which is output from the interface unit in a state in which a user has caused the robot to move to the first locating post Unlike FIG. 7, a guide for arranging the robot at the locating post is output. The robot is arranged to face the front side at the locating post.

As illustrated in FIGS. 7 and 8, when the robot 1 arrives as the selected locating post, the interface unit 230 outputs detailed information for arranging the robot at the locating post. For example, the interface unit 230 outputs information on an orientation of the robot or a detailed position at the locating post. The user can ascertain the output information and accurately arrange the robot 1.

Figure 9:
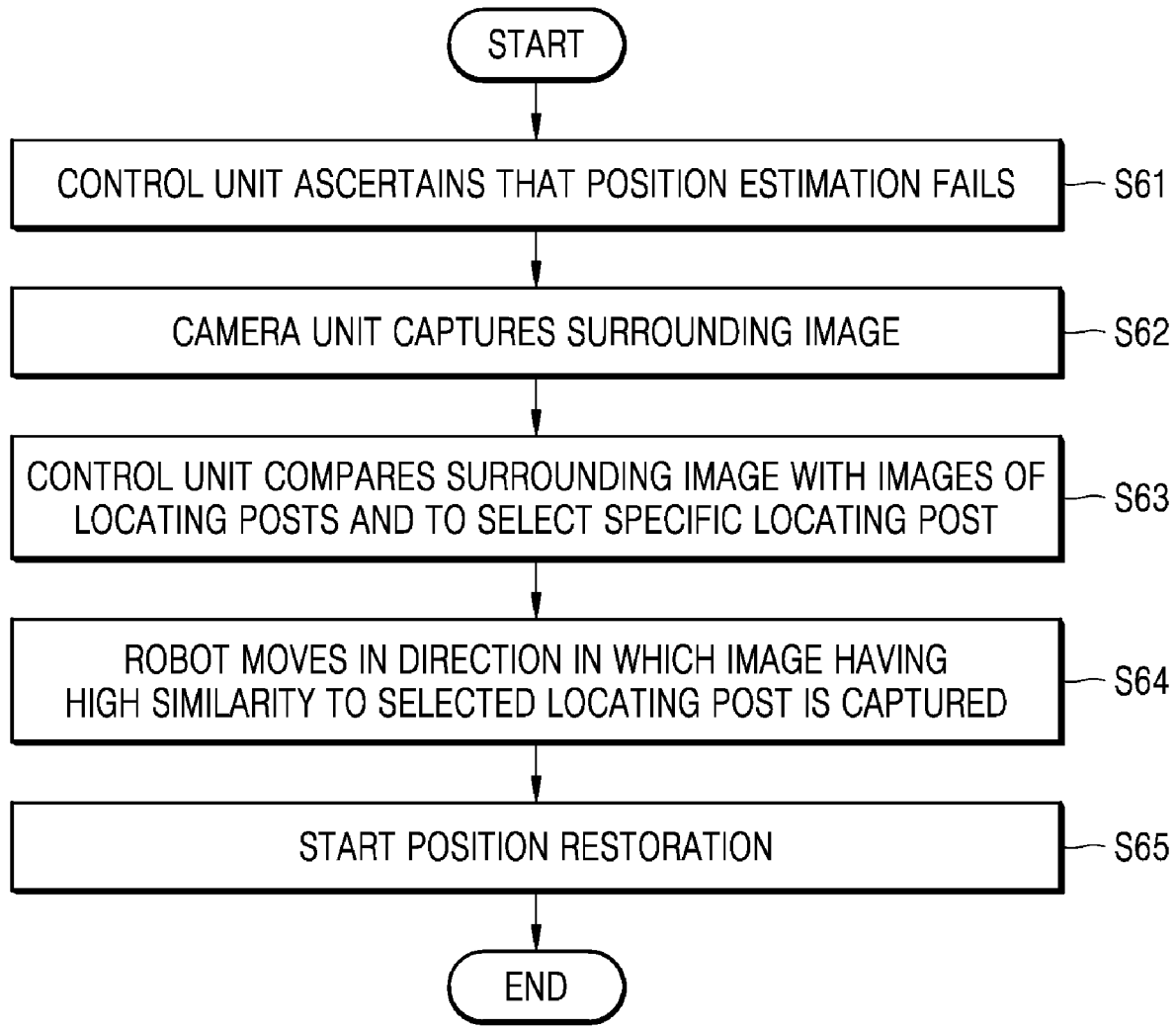
FIG. 9 is a flowchart illustrating a routine of causing a robot to automatically select a locating post according to an embodiment of the invention.

FIG. 9 is a flowchart illustrating a routine of causing a robot to automatically select a locating post according to an embodiment of the invention. The control unit 250 ascertains that position estimation has failed (S61). The camera unit 260 captures an image near the robot (S62). At this time, the control unit 260 can store a relative distance or direction between the captured image and the current position of the robot for each image.

Thereafter, the control unit 250 compares the captured image with the images of the locating posts and selects one locating post (S63). Then, the control unit 250 causes the robot to move in a direction in which an image having high similarity to the selected locating post is captured (S64). In this course, the robot 1 can avoid an obstacle using the obstacle sensor 220 and move.

When the robot 1 is moving, the control unit 250 can capture an image at a position to which the robot is intended to move and compare the captured image with the stored locating post, thereby enhancing accuracy in selecting a locating post.

When the robot 1 actually moves to the selected locating post, the control unit 250 starts position restoration (S65).

According to this embodiment, in a state of position estimation failure in which a robot cannot ascertain a position of the robot on the map while the robot travels autonomously, the robot can move to a locating post and restore the position. When position estimation fails, a locating post to which a robot should move for restoration includes position information and information of one or more images as a set.

The interface unit 230 of the robot outputs images of locating posts such that a user can select a locating post. Then, the user compares the images with an image of the surroundings, selects a specific locating post, and cause the robot to move to the selected locating post. As a result, a user who cannot control the robot can restore a position of the robot using the images.

FIG. 10 is a diagram illustrating a routine of controlling a movement unit and an obstacle sensor when a robot is moving manually according to an embodiment of the invention.

70*a* illustrates a top view of the robot 1 illustrated in FIG. 1. 70*b* illustrates a perspective view of a lateral-lower side of the robot 1. A user can push the robot 1 in a direction of arrow 72*a* with a hand 71. When an external force is applied to the robot after a locating post has been selected, the control unit 250 supplies electric energy to a motor of the movement units 190*a* and 190*b*. Accordingly, the robot 1 can move easily in the direction of arrow 72*b* as illustrated in 70*b*.

When a user pushes the robot 1 before a locating post has been selected, the control unit 250 stops rotation of the movement units 190*a* and 190*b* such that the robot 1 does not move.

However, when a user pushes the robot 1 after a locating post has been selected, the control unit 250 rotates the movement units 190*a* and 190*b* such that the robot 1 moves easily in the direction of arrow 72*b*. The control unit 250 continues to sense an external force applied to the robot 1 and stops rotation of the movement units 190*a* and 190*b* when the external force disappears.

For example, an external force is sensed when the robot 1 is stopped and a force is applied to the movement units 190*a* and 190*b* of the robot. For example, an external force is sensed when a force is applied to the movement units 190*a* and 190*b* such that the robot 1 is accelerated or decelerated while the robot 1 is moving.

Figure 11:
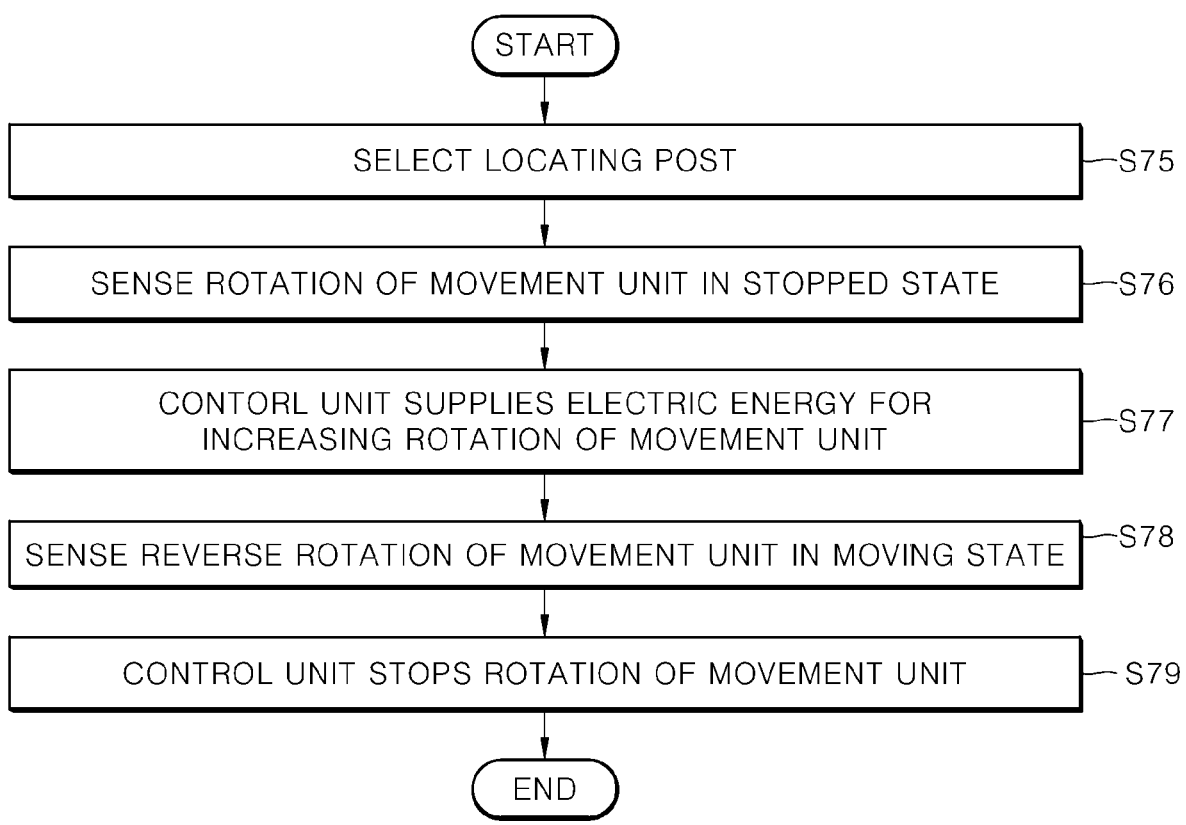
FIG. 11 is a flowchart illustrating a routine of causing a control unit to sense an external force according to an embodiment of the invention.

FIG. 11 is a flowchart illustrating a routine of causing a control unit to sense an external force according to an embodiment of the invention.

When a locating post is selected, the control unit 250 ascertains whether the robot 1 is caused to move manually. In a state in which the robot 1 is stopped, the control unit 250 senses rotation of the movement units 190*a* and 190*b*. This is a situation in which a user pushes the robot 1 and the movement units 190*a* and 190*b* rotate.

At this time, the control unit 250 supplies electric energy for increasing rotation of the movement units 190*a* and 190*b* to the movement units 190*a* and 190*b* such that the robot 1 can move easily (S77). For example, the control unit 250 may increase the number of revolutions of wheels of the movement units 190*a* and 190*b* per unit time or increase electric energy which is supplied to the motor of the movement units 190*a* and 190*b*.

Thereafter, the control unit 250 senses reverse rotation of the movement units 190*a* and 190*b* while the robot 1 is moving (S78). This is a situation in which a user causes the robot to move in another direction or intends to stop the robot. Accordingly, the control unit 250 stops rotation of the movement units 190*a* and 190*b* such that the robot 1 is stopped (S79).

Thereafter, when a user pushes the robot 1 again as in S76, the control unit 250 repeats the above-mentioned routine.

As illustrated in FIGS. 10 and 11, when a user selects a locating post, the control unit 250 controls the movement units 190*a* and 190*b* such that the robot 1 moves in response to an external force which is applied to the robot 1.

FIG. 12 is a diagram illustrating a routine of causing a robot to avoid an obstacle when the robot moves manually according to an embodiment of the invention. For the purpose of convenience of explanation, the display unit 20 is not illustrated.

Various obstacle sensors are disposed on the outer surface of the robot 1 and sense an obstacle near the robot such that the robot 1 can move while avoiding the obstacle.

When the robot 1 moves to a locating post under the control of a user and recognizes the user as an obstacle, movement of the robot 1 may depart from the control of the user. Accordingly, it is necessary to control the obstacle sensors such that the robot 1 does not recognize the user as an obstacle.

When a user pushes the robot 1 to move, an obstacle near the robot 1 can also be recognized by the user and thus an obstacle avoiding motion of the robot 1 should be performed unlike that in traveling autonomously.

In 81, in a situation in which a user pushes the robot with a hand 71, a direction in which the obstacle sensors do not operate is marked by X and a direction in which the obstacle sensors operate is marked by O. The obstacle sensors (which are marked by X) near the direction in which the user pushes the robot are controlled not to sense an obstacle when the robot is moving to a locating post. Alternatively, the control unit 250 controls the obstacle sensors at the positions marked by X such that the robot 1 does not perform an avoidance motion for an obstacle sensed by the obstacle sensors.

A reference distance d1 which is maintained for the robot 1 to avoid an obstacle when the robot 1 travels autonomously may be decreased when the robot 1 moves to a locating post.

In 82, an area in which the robot 1 senses an obstacle and performs an avoidance motion is indicated by 82*a*. Accordingly, the robot 1 performs an avoidance motion when an obstacle within d1 is sensed.

On the other hand, when the robot 1 moves manually to a locating post, a user controls the robot 1 and thus the robot 1 may not perform an obstacle avoiding motion at all. Alternatively, the robot 1 may set an area in which the robot senses an obstacle and performs avoidance motion as illustrated in FIG. 83 to a very small range. As a result, the robot 1 performs an avoidance motion when an obstacle within d2 is sensed. The avoidance motion of the robot 1 includes motions of avoiding an obstacle, changing a direction thereof, or stopping.

FIG. 12 can be summarized as follows.

As illustrated in 81, after a locating post has been selected, the control unit 250 determines that an obstacle which is repeatedly sensed by the obstacle sensors after an external force has been applied to the robot is a person, and controls the robot such that the robot does not perform an avoidance motion. The control unit 250 determines an obstacle in a direction in which an external force is applied to the robot or a direction adjacent to the direction in which the external force is applied to the robot to be a person, and controls the robot 1 such that the robot 1 does not perform an avoidance motion.

As illustrated in 83, after a locating post has been selected, the control unit decreases the reference distance d2 to an obstacle which is set for the robot to perform an avoidance motion. As a result, a user can cause the robot 1 to move easily.

Figure 13:
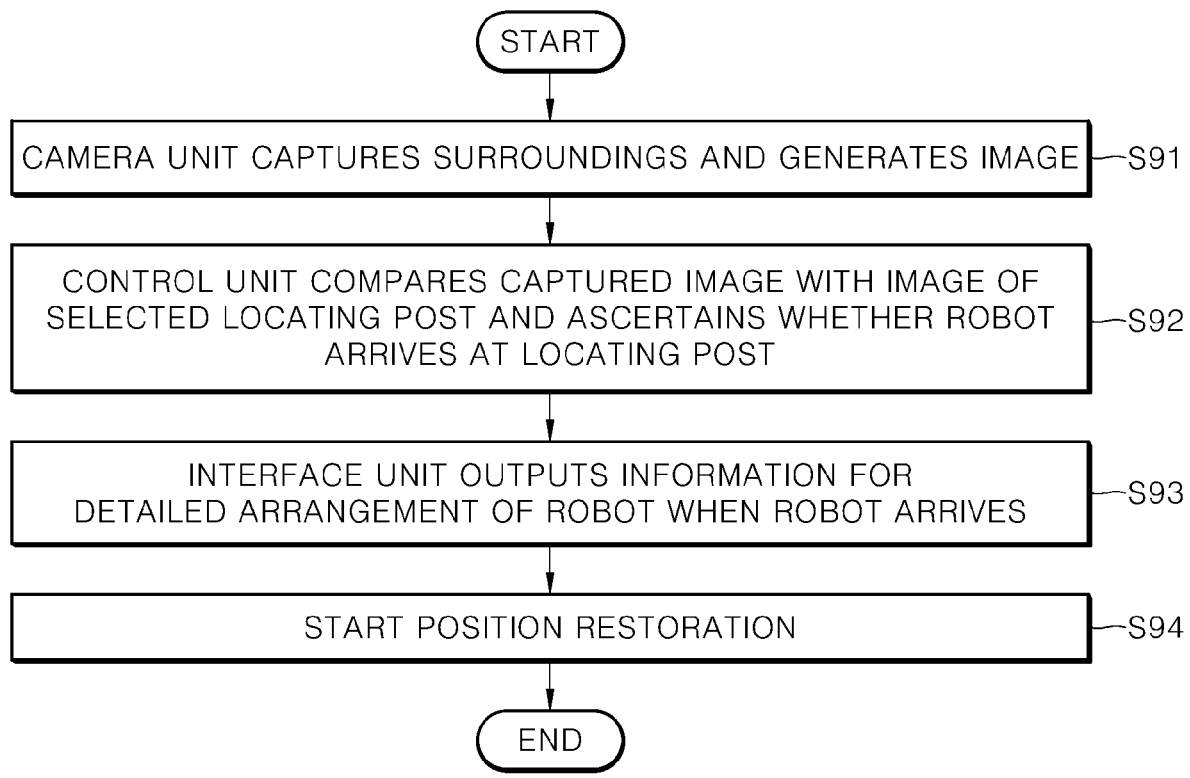
FIG. 13 is a flowchart illustrating a routine of causing a robot to capture an image of surroundings and to compare the captured image with an image of a locating post according to an embodiment of the invention.

FIG. 13 is a flowchart illustrating a routine of causing a robot to capture an image of the surroundings and to compare the captured image with an image of a locating post according to an embodiment of the invention.

When the robot 1 moves manually under the control of a user, it can be determined whether the robot 1 has arrived at a locating post. When the robot 1 moves automatically to a locating post, it can be determined whether the robot 1 has arrived at the locating post. For this purpose, the robot 1 captures an image of the surroundings while it is moving and compares the captured image with the image of the locating post.

That is, under the control of the control unit 250, the camera unit 260 captures an image in the traveling direction of the robot. The control unit 250 generates the captured image as image information (S91). The control unit 250 compares the image of the selected locating post with the image captured by the camera unit 230 and ascertains whether the robot 1 has arrived at the selected locating post (S92).

When the robot 1 has arrived at the locating post, the interface unit 230 outputs information for detailed arrangement of the robot as illustrated in FIG. 7 or 8 (S93). Thereafter, a user selects a position restoration button or a position restoring process for the robot 1 is automatically performed (S94).

When the robot 1 arrives at the locating post, the robot 1 performs a process of restoring a position. The control unit 250 stores the position of the locating post as the current position of the robot. For example, when the robot 1 moves to the locating post "Bestshop" as illustrated in FIG. 4, the control unit 250 sets (1, 14) as the position information of the robot.

Figure 14:
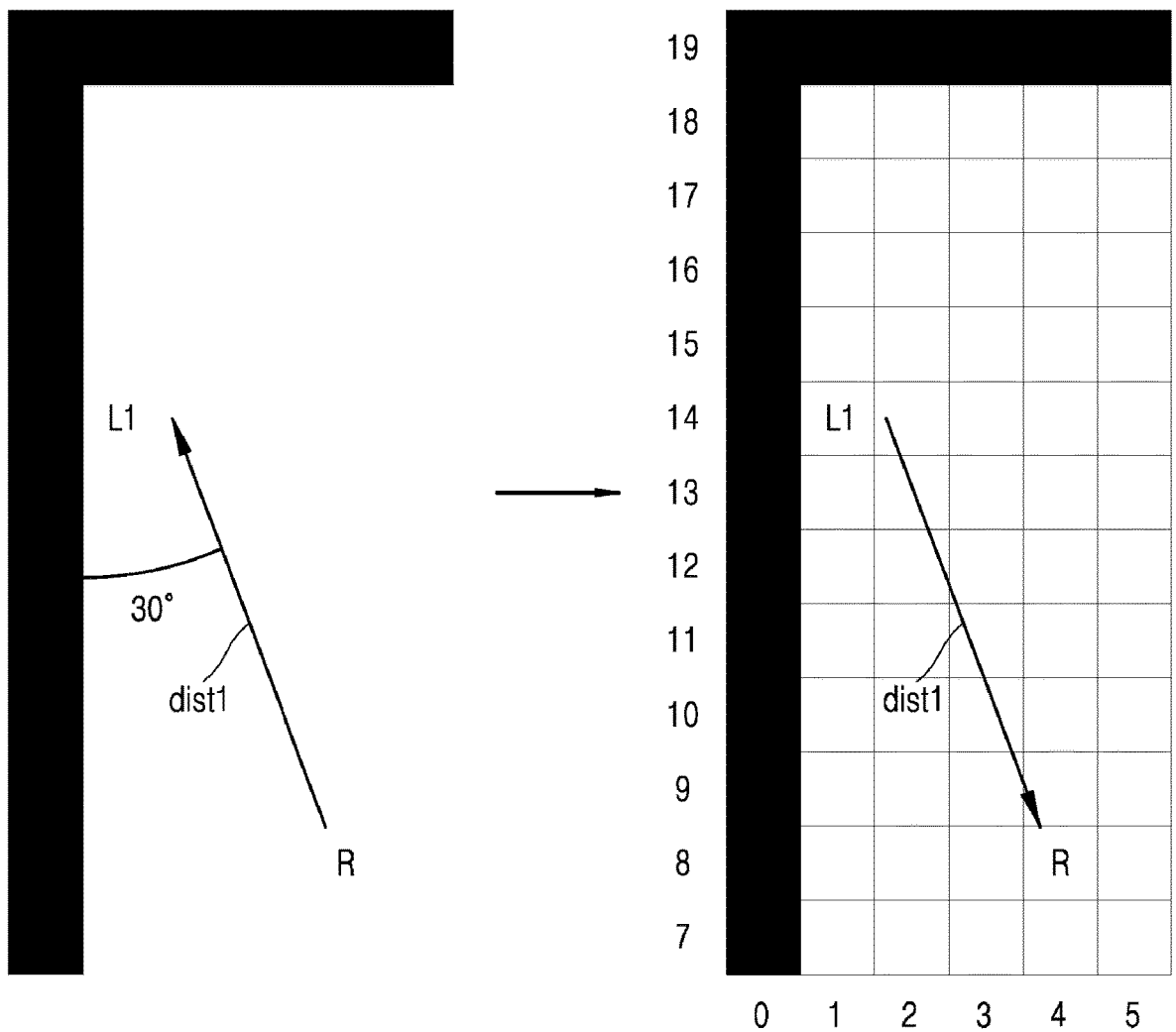
FIGS. 14 and 15 are diagrams illustrating a routine of causing a robot to ascertain a previous position when the robot restores a position according to an embodiment of the invention.
Figure 15:
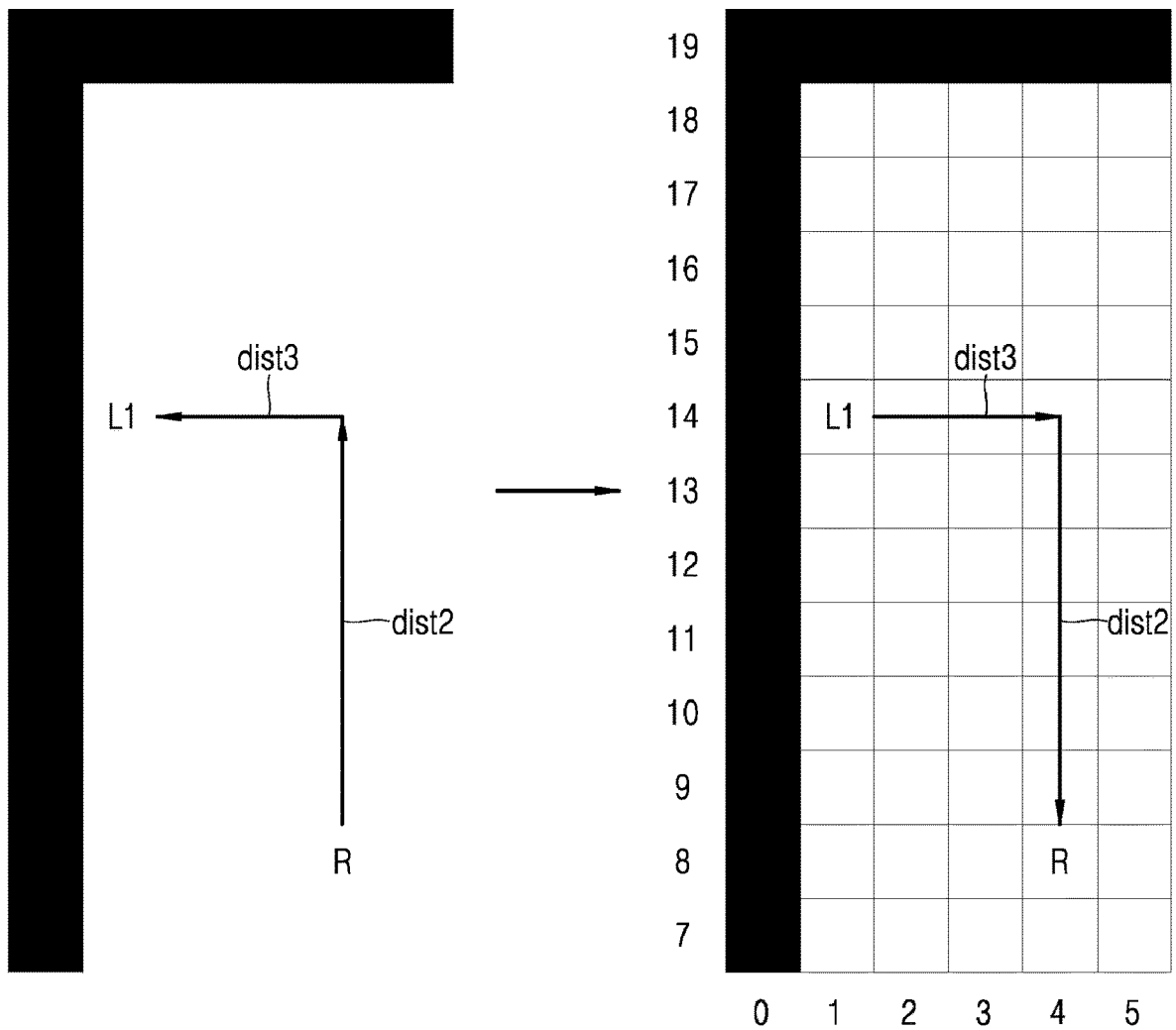

FIGS. 14 and 15 are diagrams illustrating a routine of causing a robot to ascertain a previous position when the robot restores a position according to an embodiment of the invention.

When the robot 1 cannot ascertain a position thereof in a mode in which a locating post is selected under the control of a user, the robot outputs one or more locating posts. Then, the user selects one of the output locating posts. At this time, the control unit 250 sets a position at which the locating posts are output or a position at which the locating post is selected as a starting point.

In a mode in which a locating post is automatically selected without the control of a user, the control unit 250 sets a position at which the locating post is selected as a starting point.

Then, the control unit 250 moves to the locating point under the control of a user or autonomously and records rotation, direction change, and the like of the movement units 190*a* and 190*b*. The control unit 250 stores a route along which the robot moves from the starting point to the locating post. In addition, an angle which is formed by the locating post and the robot 1 is also stored.

When the robot 1 arrives at the locating post, the control unit 250 sets an arrival point of the route as the coordinates of the locating point. The control unit 250 can reversely calculate the previous route from the arrival point and ascertain the starting point on the map.

FIGS. 14 and 15 illustrate only a part of the map illustrated in FIG. 3.

In FIG. 14, R represents a starting point at which the robot cannot ascertain position information and determines to move to a locating point L1. The robot moves to the locating post L1 under the control of a user or autonomously as indicated by an arrow.

When the robot moves straightly in the course, the robot stores distance information dist1 until it arrives at the locating post L1 and an angle (30°) which is formed by the robot 1 and the locating post when it arrives at the locating post. Then, the control unit 250 of the robot arriving at the locating post L1 calculates the position of the starting point as (4, 8) using the angle 30°, the distance dist1, and the position information (1, 14) of the locating post L1.

In FIG. 15, R represents a starting point at which the robot cannot ascertain position information and determines to move to a locating point L1. The robot moves to the locating post L1 under the control of a user or autonomously as indicated by an arrow.

When the robot moves straightly in the course, the robot stores distance information dist2 and dist3 and rectangular movement dist2-dist3 until it arrives at the locating post L1 and an angle (90°) which is formed by the robot 1 and the locating post when it arrives at the locating post. Then, the control unit 250 of the robot arriving at the locating post L1 calculates the position of the starting point as (4, 8) using the angle 90°, two distances dist2 and dist3, the rectangular movement, and the position information (1, 14) of the locating post L1.

The control unit 250 can have an artificial intelligence module additionally mounted therein. When an image captured by the camera unit 260 is provided to the control unit 250, the artificial intelligence module in the control unit 250 can receive a sensed value and determine similarity between images. Examples of the artificial intelligence module include machine learning and a deep learning network.

The control unit 250 can perform context awareness using the artificial intelligence module. Similarly, the control unit can recognize context of the robot 100 using the sensed values, the control of a user, information received from other robots or a server, or the like as input values of the artificial intelligence module.

The control unit 250 can receive images captured by the camera unit 260 and analyze the images using the artificial intelligence module. That is, the control unit 250 can perform image processing.

The artificial intelligence module includes an inference engine, a neural network, and a probability model. The artificial intelligence module can perform supervised learning or unsupervised learning based on various data.

The artificial intelligence module can recognize a user's voice and perform natural language processing to extract information from the recognized voice.

Accordingly, according to the embodiment of the invention, in the course of selecting a locating post or moving to a locating post, the artificial intelligence module in the control unit 250 can perform a process of comparing images and performing determination.

When all elements of the embodiments of the invention are described to be combined into one element or to operate in combination, the invention is not limited to the embodiments and all the elements may be selectively combined to operate within the scope of the invention. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the invention can be realized. Examples of a storage medium having stored the computer program include storage mediums such as a magnetic recording medium, an optical recording medium, and a semiconductor recording medium. The computer program for realizing the embodiments of the invention includes a program module which is transmitted via an external device in real time.

While embodiments of the invention have been described above, various changes or modifications can be made thereon by those skilled in the art. Accordingly, it should be understood that such changes and modifications belong to the scope of the invention without departing from the scope of the invention.

What is claimed is:

1. A robot that redefines a position using artificial intelligence, the robot comprising:
an interface unit configured to output information and to receive information from an external source;
an obstacle sensor that senses an external obstacle;
a map storage unit configured to separately store an entrance-allowable area and an entrance-unallowable area in a space in which the robot moves and to store locating posts which are required for the robot to restore a position;
a movement unit that causes the robot to move; and
a control unit configured to:
control the obstacle sensor and the movement unit such that the robot moves in response to an external force applied to the robot;
identify a position of the robot on a map, and
decrease a reference distance from an obstacle which is set such that the robot performs an avoidance motion of avoiding the obstacle when the locating post has been selected,
wherein the interface unit is further configured to:
output one or more locating posts when the control unit is not able to ascertain the position of the robot from the map storage unit, and
receive information for selecting one of the output locating posts.

2. The robot that redefines a position using artificial intelligence according to claim 1, wherein the control unit is further configured to control the robot such that the robot does not perform an avoidance motion of avoiding an obstacle which is repeatedly sensed by the obstacle sensor after the external force has been applied to the robot when the locating post has been selected.

3. The robot that redefines a position using artificial intelligence according to claim 1, further comprising a camera unit configured to capture an image, wherein the control unit is further configured to cause the robot to move in response to the external force and to control the camera unit such that an image in a traveling direction of the robot is captured, and wherein the control unit is further configured to compare the image captured by the camera unit with an image of the selected locating post and to determine whether the robot has arrived at the selected locating post.

4. The robot that redefines a position using artificial intelligence according to claim 1, wherein the control unit is further configured to perform a process of restoring the position of the robot when the robot has arrived at the selected locating post.

5. The robot that redefines a position using artificial intelligence according to claim 1, wherein the control unit is further configured to:
store a route for moving to the selected locating post with a position at which the one or more locating posts have been output or a position at which the one locating post has been selected as a starting point, and
ascertain the starting point on the map on the basis of the position of the selected locating post on the map and the route when the robot arrives at the selected locating post.

6. The robot that redefines a position using artificial intelligence according to claim 1, wherein the interface unit is further configured to output information on an orientation or a detailed position of the robot at the selected locating post.

7. The robot that redefines a position using artificial intelligence according to claim 1, wherein the robot further comprises:
a camera unit configured to capture an image near the robot; and
wherein the control unit is further configured to compare the image captured by the camera unit with images of the locating posts stored in the map storage unit when the control unit is not able to ascertain the position of the robot from the map storage unit and to select one locating post, and
to cause the robot to move to the selected locating post.

8. The robot that redefines a position using artificial intelligence according to claim 7, wherein the control unit is further configured to cause the robot to move and to control the camera unit such that an image in a traveling direction of the robot is captured, and
wherein the control unit is further configured to compare an image captured by the camera unit with an image of the selected locating post and to generate a route which is required for the robot to arrive at the selected locating post.

9. The robot that redefines a position using artificial intelligence according to claim 7, wherein the control unit is further configured to perform a process of restoring the position of the robot when the robot has arrived at the selected locating post.

10. The robot that redefines a position using artificial intelligence according to claim 7, wherein the control unit is further configured to store a route for moving to the selected locating post with a position at which the one locating post has been selected as a starting point, and to ascertain the starting point on the map on the basis of the position of the selected locating post on the map and the route when the robot arrives at the selected locating post.

11. A method of redefining a position of a robot using artificial intelligence, the method comprising:
   determining that the position of the robot is not able to be ascertained from a map storage unit of the robot;
   outputting one or more locating posts stored in the map storage unit;
   receiving information for selecting one of the output locating posts;
   control a movement unit of the robot such that the robot moves in response to an external force which is applied to the robot; and
   decrease a reference distance from an obstacle which is set such that the robot performs an avoidance motion of avoiding the obstacle after receiving the information for selecting one of the output locating posts.

12. The method of redefining a position of a robot using artificial intelligence according to claim 11, further comprising controlling the robot such that the robot does not perform an avoidance motion of avoiding an obstacle which is repeatedly sensed by the obstacle sensor after the external force has been applied to the robot, after the receiving of the information.

13. The method of redefining a position of a robot using artificial intelligence according to claim 11, further comprising: capturing an image in a traveling direction of the robot when the control unit causes the robot to move in response to the external force; and comparing the captured image with an image of the selected locating post and determining whether the robot has arrived at the selected locating post.

14. The method of redefining a position of a robot using artificial intelligence according to claim 11, further comprising performing a process of restoring the position of the robot when the robot has arrived at the selected locating post.

15. The method of redefining a position of a robot using artificial intelligence according to claim 11, further comprising:
   storing a route for moving to the selected locating post with a position at which the one or more locating posts have been output or a position at which the one locating post has been selected as a starting point; and
   ascertaining the starting point on the map on the basis of the position of the selected locating post on the map and the route when the robot arrives at the selected locating post.

16. The method of redefining a position of a robot using artificial intelligence according to claim 11, further comprising outputting information on an orientation or a detailed position of the robot at the selected locating post.

* * * * *